Nov. 25, 1958 G. G. ENSIGN ET AL 2,862,039
ART OF TERMINAL STRUCTURES FOR ELECTRICAL ENERGY CELLS
Filed Nov. 21, 1956 3 Sheets-Sheet 1
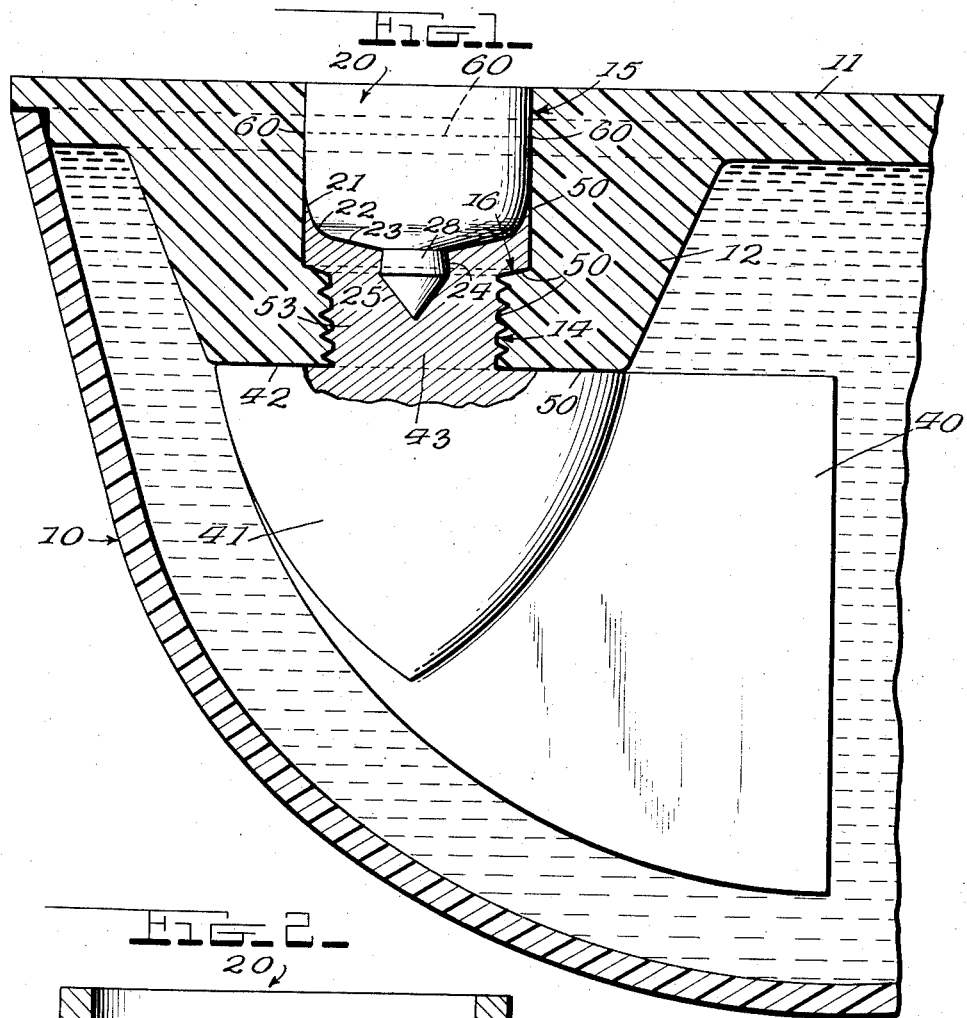
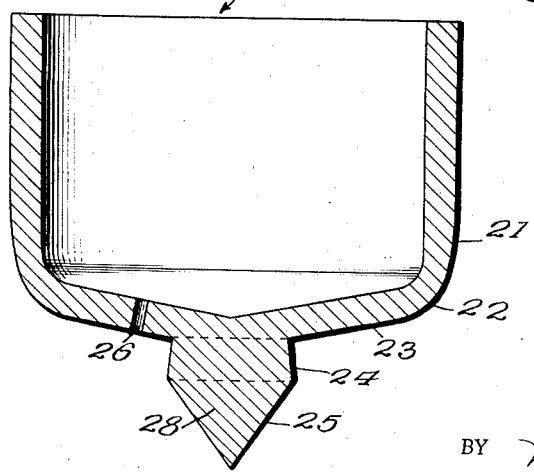
INVENTORS
G. G. Ensign and
T. L. Boswell
BY Mason, Porter, Diller & Stewart
ATTORNEYS Nov. 25, 1958     G. G. ENSIGN ET AL     2,862,039
ART OF TERMINAL STRUCTURES FOR ELECTRICAL ENERGY CELLS
Filed Nov. 21, 1956                      3 Sheets-Sheet 2
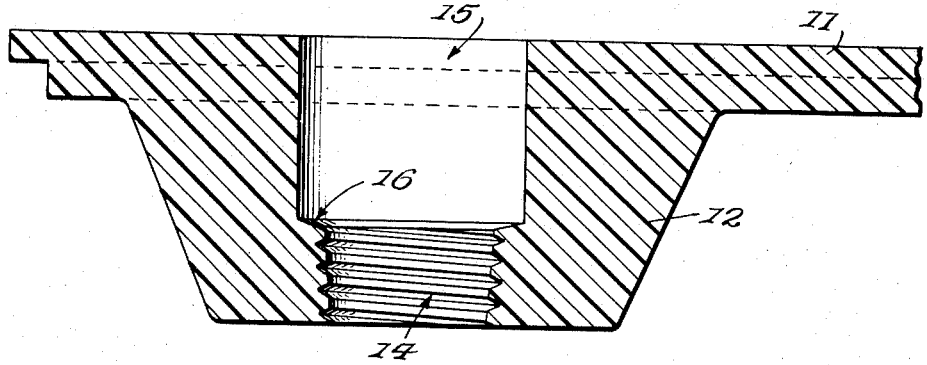
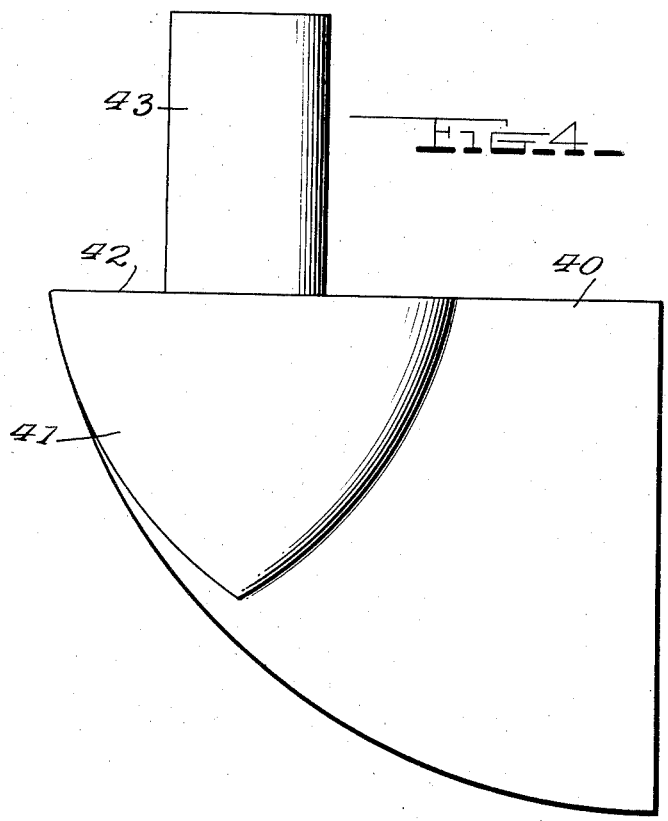
INVENTORS
G. G. Ensign and
T. L. Boswell
BY Mason, Porter, Diller & Stewart,
ATTORNEYS

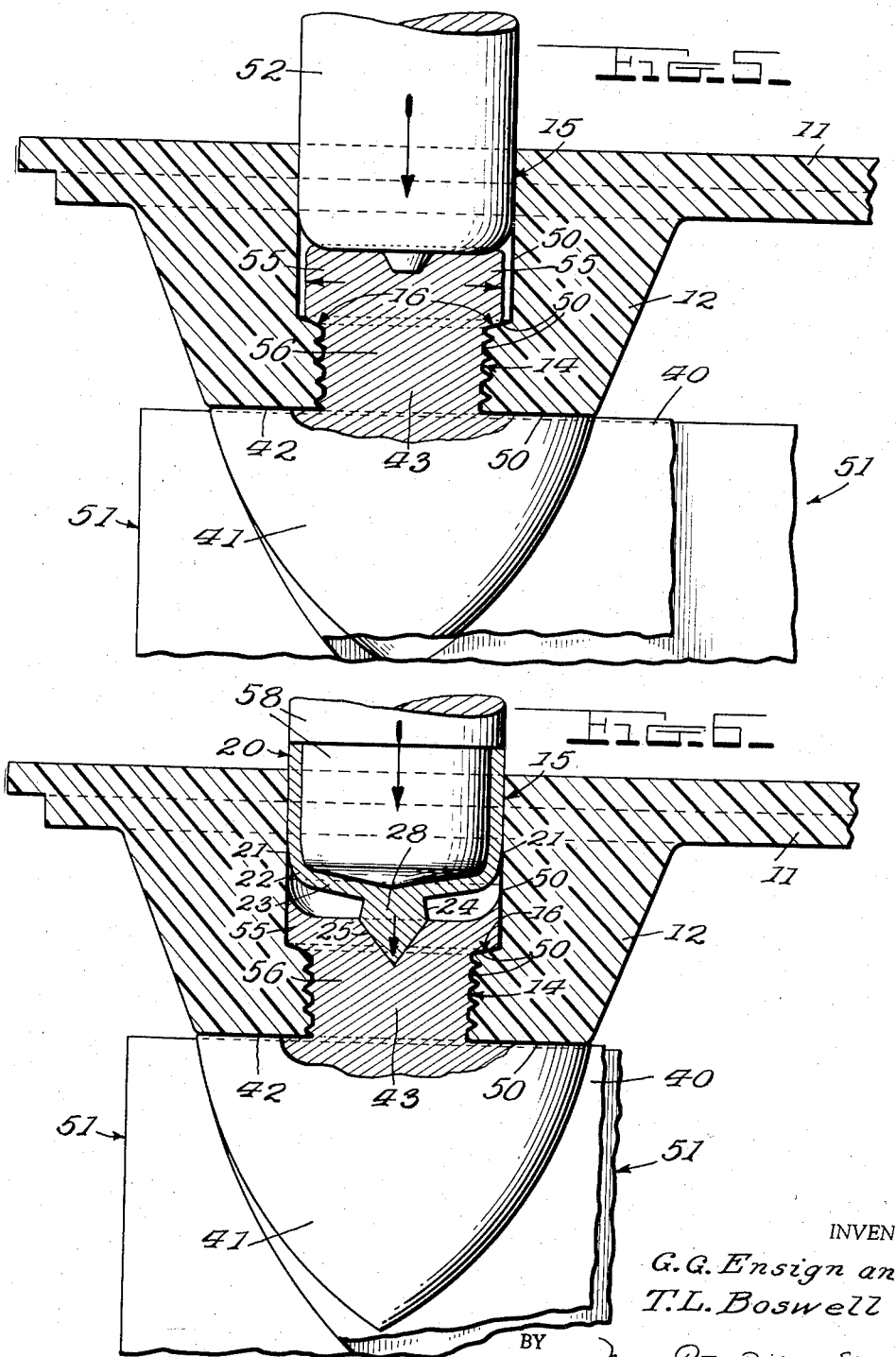

United States Patent Office 2,862,039
Patented Nov. 25, 1958

2,862,039
ART OF TERMINAL STRUCTURES FOR ELECTRICAL ENERGY CELLS

George G. Ensign and Thomas L. Boswell, Elgin, Ill., assignors to Elgin National Watch Company, Elgin, Ill., a corporation of Illinois Application November 21, 1956, Serial No. 623,580

26 Claims. (Cl. 136—135)

This invention relates to the art of terminal structures for electrical energy cells.

In our copending application, Ser. No. 297,012, filed July 3, 1952, now Patent No. 2,781,414, we have described electrical energy producing cells which can be of small size, and in which the anode has an integral extension which is received in an opening of the battery case, an external terminal member is mechanically and electrically joined to the anode extension within the opening, and a sealing medium is employed to prevent movement of electrolyte along the anode and casing surfaces and to the exterior through such opening.

It has been found that an excellent mechanical holding of an electrode in place, and a maintained electrical connection to an external terminal member can be effected by employing such external member as a tool to effect cold flow of the metal of an electrode extension to a limit imposed at the operating load by establishment of a thin or feather-edged section between the wall of the casing opening, particularly under elastic conditions.

An object of the invention is the provision of an electrical energy cell having a casing with an opening, an electrode having an extension located in the opening, and an external terminal member electrically connected with the extension and having a wall which in part is directed at an acute angle relative to the adjacent part of the opening wall, wherein the metal of the extension has a feather-edged portion located between said wall parts.

Another object is to form a mechanical construction which will minimize the cold flow or creep of indium during service by the ability of the feathered edge to support a higher load, thus maintaining tighter sealing relationship.

Another object is a method of forming such structures.

A further object is the provision of a cell assembly in which the forming operations produce an electrode and terminal structure of electrically connected parts mechanically connected and supported by a casing member, with a limit established in the forming operations during cold flow which is thereafter effective, under resilient effects established in attaining the limit, for maintaining structural and sealing integrity.

With these and other objects in view, as will appear in the following description and claims, an illustrative embodiment of the invention is shown on the accompanying drawings, in which:

Figure 1 is a sectional view through a part of an electrical energy producing cell, with an electrode and terminal assembly according to this invention.

Fig. 2 is a sectional view, on a larger scale of an external terminal member.

Fig. 3 is a sectional view, on the scale of Fig. 1, of a part of a cell casing.

Fig. 4 is a view, on the scale of Fig. 1, showing an electrode structure for assembly in a cell casing.

Fig. 5 is a sectional view, on the scale of Figs. 1 and 4, showing a first forming operation being performed.

Fig. 6 is a sectional view, corresponding to Fig. 5, but with the external terminal member having been introduced and forced partly toward final position.

In Figs. 1–4, a cell casing is illustratively comprised of a body portion 10 and a cover portion 11: in final assembly these portions are joined and sealed by a cement impervious to the electrolyte. For example, when the casing portions are molded of polyvinyl formal, which is resistant to alkaline electrolyte, the cement may be a 10 percent solution of polyvinyl formal in ethylene dichloride.

The casing portion 11 has a boss 12 which extends into the casing space and has an aperture therethrough with a smaller inner bore 14 and a larger outer bore 15, joined by a shoulder 16 of conical shape. It is preferred to employ a screw tap for forming minute grooves in the wall of the inner bore 15, and to have this bore 15 of a tapered or conical shape with the apex directed along a line extending toward the inside of the cell. For simplicity, the wall of the larger bore 15 can be essentially cylindrical, with an insignificant minor departure for draft in order to permit simple molding of the portion 11.

In the illustrative form, in which the embodiment is concerned with a small battery used in electrically operated watches the thickness from the upper surface of the casing portion 11 to the bottom of the boss 12 can be 0.090 inch; and the diameter of the outer bore 15 can be 0.070 inch. The inner and smaller bore 14 has fine grooves or chases in its surface. It can be formed by drilling a hole about a thousandth of an inch larger than the diameter of the electrode extension 43, and then employing an 80 pitch thread tap with an external diameter of 0.060 inch. The bore wall surface is thus constituted of lands and grooves of approximately equal widths. The junction of the conical shoulder 16 with the wall surface of bore 15 can be about 0.057 inch below the upper surface of the casing portion 11, the shoulder being inclined at about 60 degrees relative to the axis of the bore holes.

The external terminal member 20 illustratively can be a silver cup having an upper cylindrical portion with an outside diameter of say 0.070 inch and an internal diameter of 0.060 inch. The lower outer surface is curved, with a first portion 21 of, say, 0.050 inch radius and leading from the outside of the cylinder and then merging with a second portion 22 of shorter radius and leading to a conical bottom surface 23. From this conical surface 23 projects a spear-like body 28 having a downwardly diverging conical surface 24 at right angles to the surface 23, and a downwardly converging conical surface 25 leading to an apex with an angle of about 70 degrees. The internal lower surface of the cup is conical and parallel to the surface 23 so that the cup has an essentially uniform wall thickness, the conical apex angle at the bottom being illustratively 160 degrees. The diameter of the spear point, at the junction of surfaces 24 and 25, can be 0.020 inch. The internal depth of the cup can be about 0.047 inch, and the overall length from top lip to bottom tip 0.070 inch. Such cups can be made of hard-drawn pure silver wire of 0.078 inch diameter. Preferably, one or more vent holes 26 may be provided, e. g. by drilling, in the conical bottom wall, such hole having a diameter of about 0.010 inch.

The electrode of Fig. 4 is illustratively an anode formed from an alloy of 95 percent indium and 5 percent bismuth as set out in the Boswell copending application Ser. No. 440,867, filed July 1, 1954. It has a body portion 40 of uniform thickness (e. g. 0.057 inch) and a widened head portion 41 provided by enlargements at the two faces of the body, each enlargement being of semi-ogival shape, so that a top surface 42 is provided of a shape and size corresponding to the bottom surface of the boss 12 on the casing portion 11. From this top surface projects an integral cylindrical extension 43 for entering the smaller bore hole 14, having a diameter of 0.055 inch and having a length of about 0.090 inch, so that its mass completes the filling of the small bore 14 and the space between the terminal member 20 and the residual sealing cement on the shoulder and on the larger bore up to a feather edge below the top of the casing element 11.

In assembling the parts, a sealing cement is applied over the bottom surface of the boss 12 and in the bore 14 and on shoulder 16 to form a film: it may extend onto the wall of bore 15. A suitable cement is made with one part by weight of the Butyl rubber commercially obtainable and known as GR–I–25 (Reconstruction Finance Corporation specification), four parts by weight of polyethylene (the commercially available product known as Type DXL–2 has been found satisfactory), and one part by weight of polybutene (the commercially available product known as Type H–35 Indopol has been found satisfactory). These solid ingredients are mixed on a rubber mill, and the resulting mixture dissolved in trichlorethylene. This solution can be applied to the parts, and the solvent permitted to evaporate in major part to provide a stiff viscous mass having a shear strength slightly less than that of the metal which forms the anode extension. The deposited film 50 is resistant to the action of the electrolyte, and can seal the casing portion walls to the adjacent surfaces of the electrode and its extension without seepage therebetween or therealong. The film has pressure-sensitive adhesion to such surfaces during application and assembly, and can yield by cold flow during assembly while maintaining the sealing effect. This film 50 can be thin and need not exceed 0.001 inch and in many cases be of the order of a few ten-thousandths of an inch: and accordingly it is represented on the drawing by a heavy line.

The electrode piece 40—43 is brought into place, with the extension 43 in the bore 14, and the parts are pressed together until the part of the cement film 50 on the bottom of the boss 12 is engaged. Therewith parts of the film 50 within the bore 14 may be pushed into the larger bore, while a continuous film remains in the bore 14 adherent to the wall thereof. This can be accomplished by supporting the electrode body by a split fixture 51 and pressing the casing part 11 over and around the extension 43. A forming punch 52, e. g. of stainless steel, is then introduced from the exterior, and forced against the end of extension 43 to effect cold flow of the material. By employing a mechanical press for supporting and aligning the fixture 51 and the punch 52, the electrode is held against rocking, and its extension 43 is accurately and coaxially encountered by the forming punch 52, this punch having a point at its end, for receiving the point of the spear 28, for penetrating into the extension 43 and thus displacing parts of its mass outwardly and downwardly in a coining operation to provide a preshaping as shown in Fig. 5, in which these displaced parts 55 of the electrode extension have been moved outwardly essentially into contact with the cement film 50 in the larger bore portion 15, and relatively downwardly essentially to contact with the part of the film 50 on the shoulder 16. Therewith, the upsetting forces which produce such cold flow are also effective in the re-formed portion 56 of the extension to increase the diameter thereof so that it in turn moves toward tight engagement with the portion of the film 50 which is in the smaller bore 14. For example, when this cold flow of the material of the extension, as produced by the forming punch 52, has produced a tight contact of the electrode extension material with the cement film 50 over these bore wall surfaces, the resistance to further movement of the punch 52 increases abruptly, thus indicating that such contact has been produced. As this contact occurs with the film 50, the pressure-sensitive film material adheres to the electrode extension surfaces. The material of the film 50 is also subject to cold flow, and hence the two cold-flowing materials tend to yield to one another, noting that the resistance of the electrode extension material against cold flow is greater than that of the sealing material of 50. The effect of this forming punch 52 is to produce a radial distribution, and over the shoulder 16, essentially filling the bore hole, noting that the casing portion 11 can move to accommodate this.

This first forming step, in which a coaxial cavity is formed in the extension 43 by general radial expansion rather than by producing local radial movement of material at the end of the extension by an upsetting force delivered against the flat upper end of the extension, tends to prevent irregular movements of the electrode material, by which crevices or pockets can be formed, possibly at an external surface adjacent the film 50, or possibly enclosed by a further cold flow of the mass; noting that these pockets, and the laps or seams connected therewith, can give rise to openings along which the electrolyte may creep if the sealing film 50 is locally defective, so that the electrolyte can thus come in contact with the electrochemical junction between the silver member 20 and the anode extension, such as may happen if for any reason there is original or developed imperfection of the sealing between the surface 42 and end of the boss 12, or at the time when a major part of the electrode body 40 and its projections 41 has been consumed during cell action. Furthermore, the existence of such pockets or cavities, with air therein as a pneumatic cushion, prevents establishment of the full hydraulic cold-flow pressure at the surfaces of the film 50 and the electrode extension. Additionally, the ability to provide a forming punch 52 of a specific shape gives better control upon the coining and extrusion under cold flow of the mass of the electrode material, and permits distribution of this shaped mass so that the later press-fitting of the external member 20 assures the presence of a smooth continuous film and establishment of the feather edge at a condition of equilibrium, as set out below.

When the punch 52 has been withdrawn, the pre-shaped form of the electrode extension can be inspected: and if there is irregularity present, the part can be discarded. This is of importance for batteries which are to be used under conditions where no seepage of electrolyte to the exterior can be tolerated, as in the case of electrically operated watches and other fine mechanisms.

An external terminal member 20 is then introduced into the larger outer bore 15. By tolerance relationship, the external diameter of the terminal member 20 can be larger than the original molded diameter of the outer bore 15 by a few ten-thousandths of an inch. This terminal member 20 is engaged by a second mechanically guided punch 58 (Fig. 6), which fits guidingly within the cup-like member 20 and engages the outer lip of the cup. When the second punch, operating as a pushing piston, moves downward, the member 20 is forced into the outer bore 15 until its spear-like point 28 comes into the cavity which has been formed in the electrode extension by the punch 52, and thereby also a guiding is accomplished for accurate aligning and coaxial positioning of the cup 20 relative to the other parts. This downward or inward movement of the terminal member 20 causes it to move along any existing part of the pressure sensitive film 50 on the outer part of the bore 15, possibly displacing portions of this film, but without causing the film material to be stripped away from the wall surface of the larger bore 15, the action being by shearing within the film 50, which may be considered as having a lubricating action in the partially-evaporated state, noting that its pressure sensitive nature causes it to adhere to the terminal member 20 when brought into contact therewith under the force of the piston punch 58. During this downward or inward movement of the member 20, there is air between it and the formed wall surfaces of the cavity in the extension portion 55 of Fig. 5, but this air can escape through the aperture 26, Fig. 2.

As the downward movement of the member 20 is continued, its spear point 28 is forced into the portion 56 of the electrode extension, so that this spear point now assists in producing radially-outward movement of parts of the molded extension within the small bore 14 and adjacent the shoulder 16, with a continuous decrease in the residual unoccupied volume of the cavity in the molded portion 55 of the electrode extension, as the lower outer surface of the member 20 bears against the cavity wall and the surfaces 22, 21 effect a coining by outward flow of the engaged parts of the electrode extension. When the wall surface 25 of the spear point 28 has passed a given level within the electrode extension, then the pressure existent during cold flow causes the electrode extension material to move backward, or radially inward, and thereby engage tightly with the surface 24 of this spear point, therewith establishing a mechanical connection between the external terminal member 20 and the shaped electrode extension.

This coining of the material of the electrode extension, e. g. indium or indium alloys which are softer and more easily ductile than the material of the terminal member 20, is accompanied by relative movements of parts of the extension mass outwardly and upwardly within the film 50, usually with like movements of contacted parts of the film 50 but with adhesion and maintenance of a continuous coating of film 50 upon the shoulder and bore wall. At the areas of contact of the electrode extension material with the terminal member, however, the friction resistance at the interface is higher than the shear resistance in the indium metal or in the film material, and the conditions favor a cold welding at the interfaces under the pressure employed. Thus the deformation movement of the materials is restricted and, at a given pressure load upon the terminal member 20, the thinning of cross-section demanded for upward movement between the member 20 and the bore wall produces a condition at which the materials will no longer flow. That is, the thin feather edge thereby produced is an element which resists further flow and creates a back pressure for preventing flow at the existing load pressure: and such shaping is retained when the load is removed. In preferred practice, the materials and sizes of parts and the force exerted upon the punch 58 are so correlated that the feather edge is located about three-fourths of the distance from the shoulder 16 to the top surface of the casing member 11. It is found in practice that there is no protrusion of metal through the illustrated vent hole 26, which can be ascribed to the high friction and cold-welding effects.

It will be noted that the pre-shaping by the punch 52 has caused a gradual cold-flowing or extrusion of the electrode extension 43, with relative upsetting or decrease in its length and increase in its outside diameter, with permitted escape of air along the surface of the sealing film 50, and that forming of the mass upon the portion of the film 50 which overlies the shoulder 16 is accompanied by a force exerted upon the shoulder and having a component downwardly parallel to the common axis; while the reaction by the electrode body at its surface 42 is relatively upward, and thereby the engagement of the casing portion 11 and the surface 42 upon the part of the film 50 at the bottom surface of the boss 12 produces tight engagement of these parts, with a shaping of material so that the film 50 fills the space between the surface 42 and the bottom of the boss 12, with adhesion to both surfaces and thus sealing against penetration of electrolyte toward the smaller bore 14. Also, this forming can effect a precise conformation of the electrode extension so that the electrode is held mechanically in place by engagement of the surface 42 with the bottom of the boss 12 with the interposed shaped film 50, and by the engagement of the shaped mass 55 with the shoulder 16 through the interposed shaped portion of the film 50 on shoulder 16, with an elastic compression of the material in the boss 12.

Further downward movement of the pushing plunger 58 from the position of Fig. 6 causes the electrode and terminal parts to assume the positions in Fig. 1 in which the external terminal member 20 has caused cold flowing or extrusion of the material of the electrode extension, with exertion of further axial forces for shaping the parts and increasing the elastic compression in parts of the boss 12, between the shoulder 16 and the surface 42, and also in a radial direction by relative expansion of the outer bore 15. In the illustrative form, the member 20 is shown as occupying a position in which its outer lip is flush with the upper surface of the casing portion 11. During the course of the downward movement from the position of Fig. 6 to that of Fig. 1, the electrode extension mass and the material of film 50 are subjected to further cold flow or extrusion, and some of the material of film 50 may now be forced outward between the member 20 and the wall of bore 15: such may be wiped away at the conclusion of the assembly. At the same time, the material of the electrode extension, particularly from the mass 55, is being forced outward by the curved surface 21 of the member 20, with the aforesaid radial elastic stress from slight expansion movement of the wall of the outer bore 15, and with the successive thinning of this cold flowing mass of electrode material, until it establishes a feather edge 60 and then stops further flow upwardly in an axial direction in Fig. 1, at the specific load then being imposed between punch 58 and the fixture 51, noting that this reduction of thickness and feathering of the edge of the electrode extension material is dependent upon factors including the loading between punch 58 and fixture 51, the resilient outward yielding of the wall of bore 15, the resilient inward yielding of the terminal member 20, and any resilient compression within the materials of the film 50 and of the electrode extension mass, noting that this electrode material has a higher Hooke's limit than the pressure sensitive material of film 50. Thus, the parts have attained a static condition for the given load by the pressure upon the punch 58.

When this punch 58 is withdrawn, there is some readjustment of the elastic pressure effects, but at the several points there are opposing forces which establish a new static equilibrium, noting that these forces are individually smaller than the prior force exerted from punch 58, which led to their establishment. Thus, the feathered edge is competent of resisting creepage of the metal under the static load condition in service, and the resiliency of the parts prevents a separation or breakage of the seal which has been established by the film 50 during the course of the assembly and forming operations.

The illustrative example of practice is set out as indicating the feasibility of establishing an equilibrium and static effect between opposing elastic forces under conditions whereby the production of the aforesaid feathered edge determines an end point during the forming operation, with the continuance of elastic efforts thereafter for maintaining a sealed condition. It is obvious that the invention can be employed in many other ways, within the scope of the appended claims.

What is claimed is:

1. A terminal structure for an electrical energy cell having a casing with an aperture therein and an electrode extension of conductive ductile material, comprising an external terminal member in said aperture, the extension being in electrically conductive contact within the aperture with the terminal member, said extension having a portion located between the terminal member and the wall of the aperture, said portion successively decreasing in thickness from the inside toward the outside of the cell, the said portion having a feather edge which completely encircles the extension and is spaced from the outer end of the aperture.

2. A terminal structure for an electrical energy cell having a casing with an aperture therein and an electrode of ductile material, comprising an external terminal member in said aperture, the electrode having an electrically conductive extension into the aperture, said extension being in electrical contact with the terminal member and having a portion located between the terminal member and the wall of the aperture, said portion successively decreasing in thickness from the inside toward the outside of the cell, the said portion having a feather edge which completely encircles the extension and is spaced from the outer end of the aperture.

3. A terminal structure for an electrical energy cell having a casing with an aperture therein and an electrode of ductile material, comprising an external terminal member in said aperture, the electrode having an electrically conductive extension into the aperture, said extension being in electrical contact with the terminal member and having a portion located between the terminal member and the wall of the aperture, said portion successively decreasing in thickness from the inside toward the outside of the cell, the said portion having a feather edge which completely encircles the extension and is spaced from the outer end of the aperture, and a continuous film of electrolyte impermeable cement located between the electrode extension and the aperture wall over the adjacent portions of the same and adherent to both the extension and the aperture wall.

4. A structure as in claim 3, in which the film also extends between the terminal member and the parts of the aperture wall adjacent thereto and is adherent to the wall and to the member.

5. A terminal structure for an electrical energy cell having a casing with an aperture therein, said aperture having a larger outer bore and a smaller inner bore with a shoulder therebetween, and an electrode extension of ductile conductive material, comprising an external terminal member in said aperture, the extension being in electrically conductive contact within the larger bore with the terminal member, said extension overlying the shoulder and having a portion located between the terminal member and the wall of the larger bore, said portion successively decreasing in thickness from the inside toward the outside of the cell, the said portion having a feather edge which completely encircles the extension and is spaced from the outer end of the aperture.

6. A terminal structure as in claim 5, in which the terminal member closely fits the larger bore wall at its outer end, and has at its inner end a gradually reduced diameter, and said portion is present between the said inner end and the larger bore wall, and the feather edge is located outward relative to said gradually reduced diameter thereof.

7. A terminal structure for an electrical energy cell having a casing of resiliently yielding material with an aperture therein, said aperture having a larger outer bore and a smaller inner bore with a shoulder therebetween, and an electrode extension of ductile conductive material, comprising an external terminal member in said aperture, the extension being in electrically conductive contact within the larger bore with the terminal member, said extension overlying the shoulder and having a portion located between the terminal member and the wall of the larger bore, said portion successively decreasing in thickness from the inside toward the outside of the cell, the said portion having a feather edge which completely encircles the extension and is spaced from the outer end of the aperture, the casing material being in a state of resilient compression and effective to maintain pressure against the said portion of the extension.

8. A terminal structure as in claim 7, in which the terminal member closely fits the larger bore wall at its outer end, and has at its inner end a gradually reduced diameter, and said portion is present between the said inner end and the larger bore wall, and the feather edge is located outward relative to said gradually reduced diameter thereof, the casing material being in a state of resilient compression adjacent said portion and effective to maintain pressure thereagainst.

9. An outer terminal for an electrical energy cell having a casing with an aperture therein, comprising a metal member having a body portion with a gradually decreased diameter at its inner end and a bottom surface, and also having a spear-shaped extension from its bottom surface, said extension having a larger cross-section spaced from the bottom surface by a portion of lesser cross-section.

10. A terminal as in claim 9, in which the body portion has a vent passage extending to the exterior from said bottom surface.

11. A terminal as in claim 9, in which the member has the shape of a cup.

12. A terminal as in claim 11, in which a vent hole is provided in the bottom of the cup.

13. The process of forming a terminal structure for an electrical energy cell having a casing member with an aperture therein and an electrode extension of ductile conductive material, which comprises introducing the extension into the aperture from the inner surface of the casing member, placing an outer terminal member in the aperture from the outer surface of the casing member, pressing the terminal member against the extension and thereby producing a flow of the extension material toward the aperture wall and outwardly along the aperture wall between the aperture wall and the member to form a feathered edge on the extension, and terminating said pressing while the feathered edge is spaced from the outer end of the aperture.

14. The process as in claim 13, in which a sealing cement is first placed on the aperture wall, said cement being tightly adherent to the wall and having a lesser shear strength than the material of the said extension, and in which the pressing of terminal member in place causes flow of the cement and of the extension material outwardly along the aperture wall.

15. The process as in claim 13, in which a shaping mandrel is forced against the electrode extension for effecting a preliminary radial expansion of the outer end thereof, and the terminal member is thereafter forced against the expanded portion of the extension.

16. The process as in claim 15, in which the terminal member has a vent passage to the exterior with an inner end opening opposite the expanded portion of the extension.

17. The process as in claim 16, in which the terminal member is shaped as a cup, and the pressing thereof is accomplished by force exerted against the lip of the cup.

18. The process of forming a terminal structure for an electrical energy cell having a casing member with an aperture therein, said aperture having a larger outer bore and a smaller inner bore with a shoulder therebetween, and an electrode extension of conductive ductile material, which comprises introducing the extension into the aperture from the inner surface of the casing member, placing an outer terminal member in the aperture from the outer surface of the casing member, pressing the terminal member against the extension and thereby producing a radial flow of the extension material within the larger bore and against said shoulder and an outward flow of said material between the aperture wall and the terminal member to form a feathered edge on the extension, and terminating said pressing while the feathered edge is spaced from the outer end of the aperture.

19. The process as in claim 18, in which a sealing cement is first placed on the walls of the inner bore and the shoulder, said cement being tightly adherent to the wall and having a lesser shear strength than the material of the said extension, and the pressing of terminal member in place causes flow of the cement and of the extension material outwardly along the wall of the larger bore.

20. The process as in claim 18, in which a shaping mandrel is forced against the electrode extension for effecting a preliminary radial expansion of the outer end thereof within the larger bore and toward said shoulder, and the terminal member is thereafter forced against the expanded portion of the extension.

21. The process of forming a terminal structure for an electrical energy cell having a casing member of resilient material and having an aperture therein, and an electrode extension of conductive ductile material, which comprises introducing the extension into the aperture from the inner surface of the casing member, placing an outer terminal member in the aperture from the outer surface of the casing member, pressing the terminal member against the extension and thereby producing a flow of the extension material radially into contact with and effecting a compression of the casing material, and outwardly between the aperture wall and the member to form a feathered edge on the extension, and terminating said pressing while the feathered edge is spaced from the outer end of the aperture.

22. The process as in claim 21, in which a sealing cement is first placed on the aperture wall, said cement being tightly adherent to the wall and having a lesser shear strength than the material of the said extension, and the pressing of terminal member in place causes flow of the cement end of the extension material outwardly along the aperture wall, and wherewith the compression effect upon the casing material is in excess of the return yielding of the extension, cement and member after release of the pressure.

23. The process of forming a terminal structure for an electrical energy cell having a casing member of resilient material and having an aperture therein and an electrode extension including indium, which comprises introducing the extension into the aperture from the inner surface of the casing member, placing a silver outer terminal member in the aperture from the outer surface of the casing member, pressing the terminal member against the extension and thereby effecting cold welding of the indium to the silver and producing a flow of the extension material outwardly between the aperture wall and the member to form a feathered edge on the extension, and terminating said pressing while the feathered edge is spaced from the outer end of the aperture.

24. The process as in claim 23, in which a sealing cement is first placed on the aperture wall, said cement being tightly adherent to the wall and having a lesser shear strength than the material of the said extension whereby the cement is effective as a lubricant to permit cold flow of the extension along the aperture wall, and the pressing of terminal member in place causes flow of the cement and of the extension material outwardly along the aperture wall.

25. The process of forming a terminal structure for an electrical energy cell having a casing member with an aperture therein, and an electrode extension of conductive ductile material, which comprises introducing the extension into the aperture from the inner surface of the casing member, pressing upon the end of the extension to effect radially outward movement of the extension material and the formation of an axial cavity therein, placing an outer terminal member in the aperture from the outer surface of the casing member, said terminal member having a spear-shaped point extending from its inner end surface, said point being engaged and centered by the wall of said cavity, pressing the terminal member against the re-formed extension material whereby the spear-shaped point penetrates into the extension material, continuing the pressing until the terminal member effects cold flow of the extension material toward and into engagement with the parts of the spear-shaped point adjacent the end of the terminal member, and terminating said pressing while the feathered edge is spaced from the outer end of the aperture.

26. The process of forming a terminal structure for an electrical energy cell having a casing member of resilient material with an aperture therein and an electrode extension of conductive ductile material, which comprises introducing the extension into the aperture from the inner surface of the casing member, placing an outer terminal member in the aperture from the outer surface of the casing member, said terminal member closely fitting the aperture, pressing the terminal member against the extension and thereby producing a flow of the extension material outwardly between the aperture wall and the terminal member with resilient compression of the casing material whereby the extension material moves between the aperture wall and the terminal member to establish a feather edge at the condition of equilibrium of forces during the pressing, and terminating said pressing while the feathered edge is spaced from the outer end of the aperture.

References Cited in the file of this patent
UNITED STATES PATENTS

| | | |
|---|---|---|
| 2,683,184 | Boswell | July 6, 1954 |
| 2,772,321 | Ensign | Nov. 27, 1956 |
| 2,781,414 | Ensign et al. | Feb. 12, 1957 |